United States Patent [19]

Rothchild

[11] 3,948,434

[45] Apr. 6, 1976

[54] EXTREMELY RAPID AND ECONOMICAL METHOD FOR WELDING PIPES, ELONGATED REINFORCING BARS OR THE LIKE IN THE FIELD

[76] Inventor: Ronald D. Rothchild, 1530 Main St., Concord, Mass. 01742

[22] Filed: Jan. 22, 1975

[21] Appl. No.: 543,131

[52] U.S. Cl. .................... 228/241; 285/21; 228/57
[51] Int. Cl.² ........................................ B23K 23/00
[58] Field of Search ........... 228/57, 241; 285/18, 21

[56] References Cited
UNITED STATES PATENTS

| | | | |
|---|---|---|---|
| 2,569,956 | 10/1951 | Schiltknecht | 228/241 |
| 2,667,865 | 2/1954 | Herman | 285/21 X |
| 3,494,640 | 2/1970 | Coberly et al. | 285/21 UX |
| 3,535,767 | 10/1970 | Doherty | 285/21 X |
| 3,542,402 | 11/1970 | Caples | 285/21 |
| R24,365 | 10/1957 | Klein | 285/21 X |

Primary Examiner—James L. Jones, Jr.
Assistant Examiner—K. J. Ramsey
Attorney, Agent, or Firm—Robert L. Nathans

[57] ABSTRACT

Annular coupling members are disclosed for welding together sections of pipe used, for example, in the construction of oil pipelines, such annular coupling members containing annular bodies of exothermic materials such as "Thermite" material, and upon being ignited being capable of producing true welding of the interfaces between the coupler and a pair of pipes welded thereto or between the two pipes directly. These interfaces are beveled to accommodate variations in the diameters of the pipe sections so that any such variations will not adversely affect a true weld at these interfaces. Since the annular exothermic bodies are positioned adjacent the interfaces and interior of the annular coupler, the vast quantities of heat generated by igniting the "Thermite" bodies are directly utilized to form true welding of the interfaces, rather than being lost in varying degree to the material of separate reaction vessels, sprues, etc., as in prior art techniques.

6 Claims, 3 Drawing Figures

EXTREMELY RAPID AND ECONOMICAL METHOD FOR WELDING PIPES, ELONGATED REINFORCING BARS OR THE LIKE IN THE FIELD

BACKGROUND OF THE INVENTION

It is widely known that the construction of oil pipelines is an extremely expensive and time consuming operation which is fraught with numerous difficulties. Typically, 40 foot pipe sections having a diameter of about four feet are welded together by hand for example, in the current construction of the Alaskan pipeline. Welding is performed by hand all the way around a v-shaped notch between the pipe sections and each weld typically takes 12 man hours of direct labor. Relatively elaborate equipment is also necessary to properly align these pipe sections during this hand welding process. Obtaining labor for this purpose, particularly in the upper Arctic regions, is difficult and is very expensive due to the necessary inducement required to obtain the work forces. Also due to the very time consuming process of hand welding, labor costs are enormous. For example, it is recently estimated that the cost of the 800 mile Alaskan pipeline will be in the neighborhood of 6 billion dollars, most of which is reflected in labor costs and capital expenses relating to expensive machinery which is tied up for long periods of time on the job. It is estimated that the pipeline material cost is merely 300 million dollars out of the above-mentioned 6 billion dollar figure. Thus, it is highly desirable to sharply reduce labor costs and the tying up of expensive equipment. Furthermore, due to the inclement weather in Arctic regions, special houses are often lowered by crane over the working areas since such inclement weather interferes with the welding process.

It is thus highly desirable to sharply reduce labor costs and reduce the use of very time consuming alignment procedures in the construction of oil pipelines. Also, it is highly desirable to reduce the overall construction time. However, at the same time, it is necessary to produce very high quality welds to prevent oil spills which could result in large losses of oil and could contaminate the environment. In grappling with these problems, I became aware of the use of "Thermite" welding, taught in the prior art. For example, U.S. Pat. No. 1,355,224 to Gravell, teaches the positioning of a "Thermite" pellet between two thin sheets of metal. Upon the analysis of this technique, it became apparent to me that this technique could not be applicable to the welding of pipelines because the interface between the sheets becomes contaminated with the products of the "Thermite" reaction, and hence the above-mentioned high quality welds could not be effected through the use of this teaching. This patent also teaches the employment of pressure between the sheets to maintain contact, which teaching would not be desirable in the pipeline problem. Gravell also teaches at the bottom of Column 3 that "Thermite" tablets may be placed outside of one or both of the sheets to be joined. This teaching is also useless in connection with the solution of the pipeline problem because a majority portion of the heat generated on the coupler exterior would not penetrate the pipe coupler to the interface to be welded and would be lost to the outside environment. Additionally, placing "Thermite" bodies on the outside of pipes would produce a safety hazard. In summary, the teachings of Gravell would be useless for my purposes.

U.S. Pat. No. 3,308,532 to Long et al., teaches the use of an annular exothermic body for generating sufficient heat to activate an annular body of brazing material. Brazing, which is related to soldering, produces low strength joints with, by definition, a non-ferrous filler material. The base material, steel pipe in this case, cannot be made hot enough to melt, not even very local to the joint. Therefore, the brazing alloy must be a metal that melts at a much lower temperature than the base material.

Steel melts at about 2,700°F. Typical brazing alloys melt anywhere from 1,100°F to 1,900°F. Thus, even a relatively high temperature braze can be applied at about 800°F below the melting point of steel.

Despite their relatively low strength, brazed joints are often used instead of welds because they are so much easier to apply. They require lower temperature, and less fine temperature control since a braze can be overheated by several hundred degrees without anywhere melting the steel parts being joined. Brazed or soldered joints are thus commonly used in non-critical applications.

Though Long uses an exothermic chemical heat source, his process is nevertheless a braze and so the performance he requires from the reaction is minimal. He desires to generate a minimum amount of heat, which would be sufficient to activate the brazing material but which could not possibly affect true welding, i.e., melting of the interfaces. He states in Column 3, lines 25–35, that the base metals will not undergo physical or metallurgical damage during the exothermic reaction which implies that he is not even using a high temperature braze but rather is operating entirely below about 1,400°F, the temperature at which steel undergoes crystal phase change. It is obvious that true welding of steel pipe cannot be produced by the teachings of Long, and that his process is inappropriate for any application where high joint performance is critical.

Aside from the above, there has also been some development of "Thermite" welding techniques in the public domain over the years. These developments have involved use of a separate refractory vessel, often graphite, in which "Thermite is reacted. Molten reaction products are then poured from the vessel as required, after the reaction is completed, for use as a source of heat and/or filler material.

"Thermite" iron is typically used as filler material in producing large, low performance welds. It is difficult to prevent or control the occurrence of impurities in "Thermite"-generated iron, which prevents its use as a high-quality weld material.

Molten "Thermite" iron is used as a source of heat only in some applications. The parts to be welded are generally pressed very tightly together and preheated, as with an oxyacetylene torch. Final heating, with reacted "Thermite" poured over the joint, forms a weld. The process is elaborate and requires extensive preheating, because the "Thermite" is reacted in a separate vessel.

SUMMARY OF THE INVENTION

In accordance with a preferred embodiment of the present invention, an annular steel coupling ring or collar is provided containing at least one annular body of exothermic material positioned interior of the outer surface of the coupler and adjacent the inner surfaces thereof. Preferably two annular bodies of highly exothermic material are positioned interior of the annular coupler or collar and adjacent the interfaces to be welded. The annular cylindrical bodies are ignited in the field by, for example, a fuse, and the exothermic reaction will travel around the coupler to melt the interfaces and perform true welding in five or ten minutes so that the above-mentioned 13 man hours are virtually eliminated in producing the true weld. The annular cavities containing the exothermic material may be positioned virtually at the coupler-pipe interface in which case, to effect coupler to pipe welds, the annular cavities do not occupy the entire length of the interfaces so that even if contaminants remain after the exothermic reaction, interface portions adjacent the cavities will not be contaminated. Furthermore, I have found experimentally that, when "Thermite" is reacted adjacent cold steel, a thin alumina layer is frozen on the steel almost immediately, deposited by the reaction. in the seconds or minutes following, the steel becomes heated and molten while the "Thermite" generated iron also is still hot liquid, but the frozen alumina further prevents contamination of base material with "Thermite". This alumina layer is typically less than 1/32 of an inch thick. A preferred annular coupler has beveled interfaces to mate with tapered terminal pipe sections to accommodate variations in pipe diameter without sacrificin flush contact at the interface.

Other objects, features and advantages of the present invention will become apparent upon the perusal of the following description taken in conjunction with the drawings in which.

DETAILED DESCRIPTION

Figure 1:
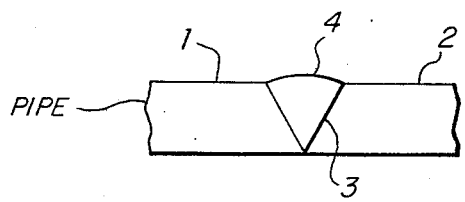
FIG. 1 illustrates a typical prior art pipe joint obtained by manual welding.

In FIG. 1, a first annular pipe portion 1 is placed adjacent a second annular pipe portion 2. Often a v-notch will be formed at the abutment of the two terminal pipe sections, which v-notch will extend substantially all the way around the pipe sections. Hand welding is produced by filling the v-notch with molten welding material as illustrated at 4, generally at a rate of about five pounds of weld material deposited per hour, and generally with a two-man work team (welder and helper). For reference, a four foot diameter pipeline joint requires over thirty pounds of deposited weld filler, or over twelve man-hours to complete.

Figure 2:
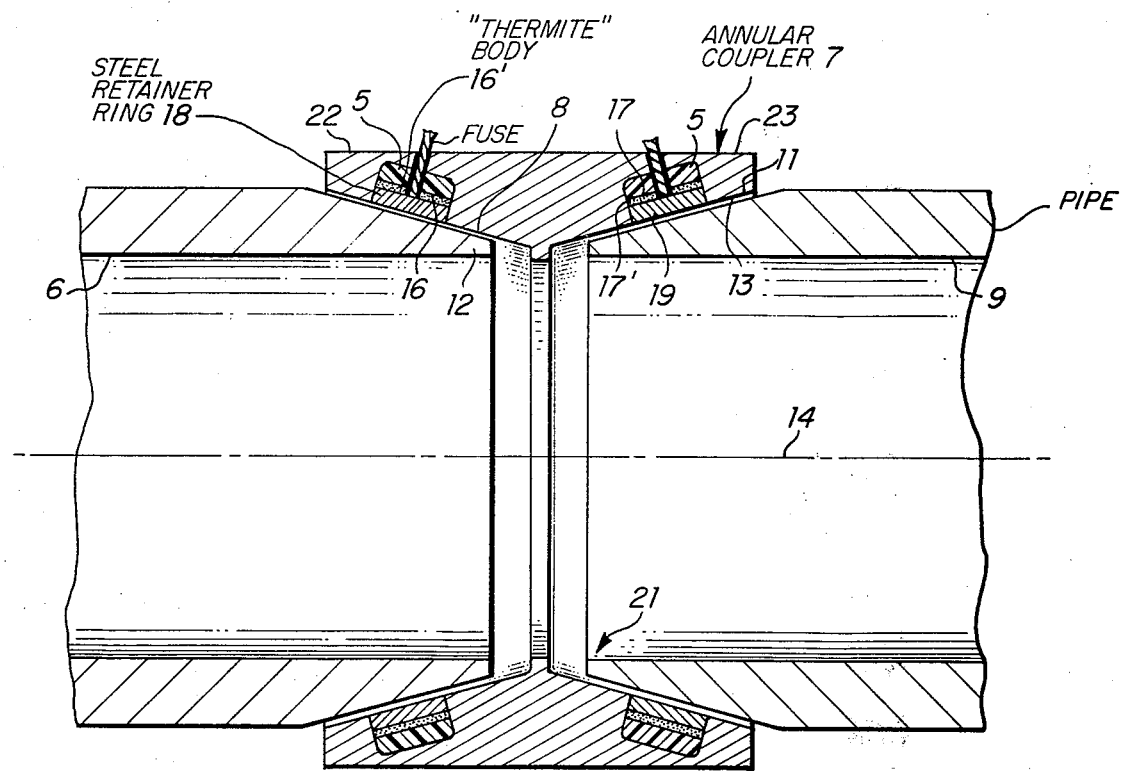
FIG. 2 illustrates a preferred annular coupler for welding first and second annular pipe sections together.
Figure 3:
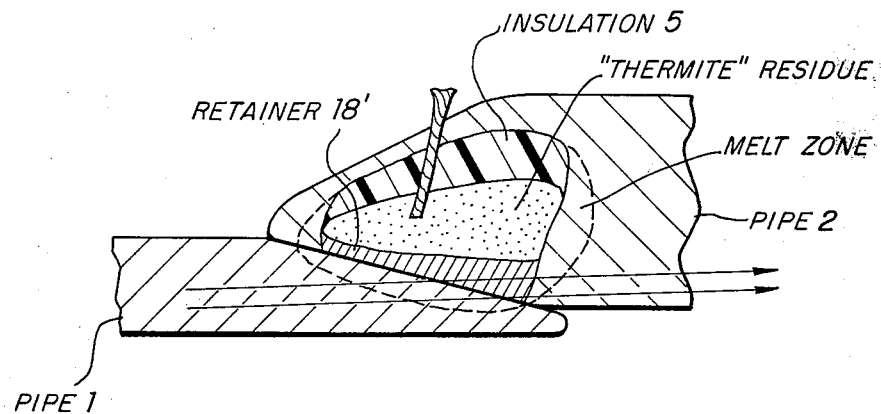
FIG. 3 illustrates another coupler configuration.

In FIG. 2, a first annular terminal pipe section portion 6 contacts annular coupler 7 along its inner surface 8, whereas a second annular terminal pipe section portion 9 contacts inner surface 11 of annular coupler 7. Preferably, the terminal pipe section portions are beveled or tapered as shown during manufacture by virtue of a simple operation with a conventional lathe. First interface 12 and second interface 13 form a small acute angle with respect to the longitudinal axis 14 of the assembly. A first annular cavity 16 contains an annular body of exothermic material 16' whereas a second annular cavity 17 contains a second body of exothermic material 17'. preferably, steel retainer rings 18 and 19 are packed within said cavities to retain the exothermic bodies in place. Lower portion 21 of the coupler will not be described as its components are identical with the recited components. It is important to note that the annular cavities containing the exothermic bodies are positioned interior of the outside surfaces 22 and 23 of my coupler, and that these cavities may further be surrounded by an outer annular ring of thermal insulation 5 built into and just within the outer coupler surfaces 22 and 23, so that the intense heat generated by the exothermic reaction will not be lost to the outside environment or will not melt the coupler and will be concentrated at the interfaces to be welded together. Furthermore, it is important to note that the cavities preferably do not occupy the entire length of the interfaces so that although intense heat is available for interface welding, the interfaces will be free from contaminants which adversely affect the necessary high quality weld produced in accordance with my invention. I prefer that the exothermic bodies be of aluminum and iron oxide, which mixture is well known as "Thermite" material. The exothermic reaction generates temperatures, before losses, in the neighborhood of 5,000°F so that, owing to the above-mentioned configuration, temperatures of upwards of 2,700°F will be available at the interfaces thereby to produce melting of the steel thereat and hence good high quality welds. The use of my interior cavities additionally readily facilitates production of high packing densities of the exothermic material which may be formed in the annular cavities (acting as molds or dies) and solidly packed so that loose packing and voids are avoided, which voids could adversely affect a solid homogeneous weld. Voids containing air could generate bubbles at the interfaces which should be avoided. Other exothermic materials are suitable provided they generate temperatures which are sufficiently elevated to cause melting of the nearby steel interfaces.

Large scale material melting, that is, what I designate as true welding, does not normally occur in steel beam welded with "Thermite" material. This is because such material is reacted in a separate crucible and then poured over the steel after the reaction is complete, and thus the first blinding flash of very intense heat is lost.

The technical feasibility of my invention was proved by performing the following experiment. One-half inch thick steel plates were placed in close proximity in a "butt to butt" relationship. There was no pressure at the butt interface as in prior art "Thermite" welding because I am depending on producing a true "melt" weld and thus no such pressure is needed. I positioned a cavity filled with "Thermite" material along one side of the butt; the steel plates comprising one wall of the cavity and wherein the other walls were of insulating material. After producing the exothermic reaction, I sawed across the weld to obtain sections. These sections indicated that there was true melting at the interface. A few small bubbles occurred in the plate caused by air trapped within the mass of "Thermite" material, which was not quite solid enough, suddenly being heated and expanding and blowing into the molten metal. I believe that it is highly probable that these bubbles will be eliminated by the provision of more solid "Thermite", closer to the theoretical density of its constituents, which with proper equipment can be formed with combined heat and pressure.

The development and use of solid "Thermite" annular bodies is believed highly desirable for several reasons. First, maximum density is desirable so that volume is minimized and the necessary quantity of "Thermite" can be contained in the coupler or collar as described, rather than in an external crucible. Reaction heat losses are thus minimized and the heat is thus used most efficiently for welding. Secondly, even within the collar, solid "Thermite" allows the annular ring of exothermic material to have minimum volume and minimum extraneous surface area. Again, it is desirable to minimize flow or transfer of heat except to the vicinity of the weld. Best performance, in terms of usable heat produced, is thus obtained from the exothermic reaction.

Thirdly, use of solid "Thermite" results in improved uniformity and control. This is due in part to the relative ease of emplacing a solid piece in a field operation, as opposed to measuring and pouring of powders. Additionally, solid "Thermite" can be used at constant density from one batch to the next so that quantities of available heat and peak temperatures also are uniform. Fourthly, to the extent that the "Thermite" is made solid approaching its theoretical maximum density, the amount of contained air may be reduced to zero.

In accordance with another feature of my invention I am able to obtain this solid "Thermite" because aluminum, one of the ingredients, melts at about 1,200°F, whereas the mixture will not ignite until a much higher temperature is reached, at about 2,000°F or more. I have heated the "Thermite" mixture to about 1,400°F so that the aluminum was liquefied; the liquid aluminum did not separate out of the mixture but remained distributed among the iron oxide particles. When the "Thermite" is in this condition, solid particles suspended in almost 40% liquid by volume, the mixture can be pressed to over 99% density. Alternatively, the near maximum density can be obtained by successive cold-press and heating cycles; the heating is similar to sintering except that sintering temperature with aluminum is normally well below its melting point.

In addition to weld configurations as shown in the accompanying illustrations, other variations are, of course, possible. Butt welds can be produced; though not illustrated. The aforementioned experimental joints were in fact butt welds. The butt welds can also be obtained with or without an alloy filler material provided in the collar. Further, the collar may include features to improve or control heat transfer rates. For example, fins of a sort may be provided, protruding into the "Thermite" cavity, to increase heat transfer in a preferred direction toward the interface. As yet I have not tested my invention on a large pipe owing to lack of funds. The present invention is also believed suitable for joining steel reinforcing bars or possibly rails in the field. The term "cylindrical" is intended to cover elongated structures having non-circular cross sections.

While preferred methods of the invention have been described, the teachings of this invention will readily suggest many other methods to those skilled in the art.

I claim:

1. A method of welding a first and second annular ferrous pipe member together along an interface therebetween comprising the step of igniting a mass of solid exothermic material positioned within at least one interior annular cavity situated adjacent said interface, said mass of exothermic material being capable of generating sufficient heat upon being ignited to melt said members along said interface to form a weld thereat.

2. The method as set forth in claim 1 wherein said interface forms an acute angle with respect to the longitudinal axis of said annular members.

3. A method of welding a first ferrous pipe member to a second ferrous pipe member at an interface therebetween comprising igniting a solid mass of exothermic material having a density which approaches the density of the constituents thereof and which is capable of generating temperatures sufficiently high to melt ferrous metals, said solid mass being positioned within an annular cavity which is in turn positioned within at least one pipe member and adjacent said interface between said first and second ferrous pipe member and away from the outer most surface of said second ferrous pipe member, which exothermic material, upon being ignited, is of a composition capable of generating sufficient heat to melt the ferrous pipe members at said interface to produce a weld between said first and second ferrous pipe members.

4. The method of claim 3 wherein said solid mass of exothermic material comprises aluminum and iron oxide.

5. The method as set forth in claim 3 wherein said interface between said first and second ferrous pipe members is oriented at an acute angle with respect to the longitudinal axis of said pipe member.

6. The method of claim 5 wherein said solid mass of exothermic material comprises aluminum and iron oxide.

* * * * *